United States Patent [19]

Fischer

[11] Patent Number: 5,443,555
[45] Date of Patent: Aug. 22, 1995

[54] INSERTION AID FOR THE STRAINER HOLDER AND AN ESPRESSO MACHINE

[75] Inventor: Daniel Fischer, Romanshorn, Switzerland

[73] Assignee: Arthur Eugster AG, Romanshorn, Switzerland

[21] Appl. No.: 273,942

[22] Filed: Jul. 12, 1994

[30] Foreign Application Priority Data

Jul. 16, 1993 [EP] European Pat. Off. ......... 931114870

[51] Int. Cl.⁶ .................... A47J 31/06; A47J 31/30
[52] U.S. Cl. ..................................... 99/295; 99/302 R
[58] Field of Search ................. 99/289 R, 279, 295, 99/300, 298, 301, 302 R, 302 FB, 302 P; 426/433; 210/481

[56] References Cited

U.S. PATENT DOCUMENTS

| | | | |
|---|---|---|---|
| 2,881,692 | 4/1959 | Volcov | 99/302 R |
| 3,599,557 | 8/1971 | Leal | 99/302 R |
| 4,660,466 | 4/1987 | Fries | 99/295 |

FOREIGN PATENT DOCUMENTS

| | | |
|---|---|---|
| 706126 | 6/1931 | France . |
| 457865 | 3/1928 | Germany . |
| 162960 | 7/1933 | Switzerland . |

*Primary Examiner*—Robert W. Jenkins
*Attorney, Agent, or Firm*—Spencer, Frank & Schneider

[57] ABSTRACT

An espresso machine has an underside provided with a brewing head into which a strainer holder having a handle can be inserted from below with a strainer inserted in the holder. The brewing head has slots and the strainer holder includes corresponding lugs that fit through the slots so that the strainer holder can be released from or locked to the brewing head by a pivoting movement of the strainer holder around an axis of the brewing head which places the lugs in or out of alignment with the slots, respectively. A positioning ring has a top end rotatably secured to the brewing head and a cutout that is open toward the bottom end of the positioning ring for receiving the handle of the strainer holder. A mechanism cooperating between the positioning ring and the brewing head locates the positioning ring in an initial position so that when the cutout in the positioning ring receives the handle of the strainer holder, the strainer holder can be raised and inserted into the brewing head with the lugs on the strainer holder in alignment with the slots in the brewing head.

6 Claims, 1 Drawing Sheet

INSERTION AID FOR THE STRAINER HOLDER AND AN ESPRESSO MACHINE

CROSS REFERENCE TO RELATED APPLICATIONS

The present application claims the right of foreign priority with respect to European Application No. EP 93 111 487.0 filed in the European Patent Office on Jul. 16, 1993, the disclosure of which is incorporated herein by reference.

BACKGROUND OF THE INVENTION

The invention relates to an espresso machine having a brewing head located on its underside, into which a strainer holder having a handle can be inserted from below with a strainer. The strainer holder can be locked to or released from the brewing head by means of a pivoting movement of the strainer holder around the axis of the brewing head. Locking and release are conventionally effected by way of a bayonet catch. For this purpose at least two lugs are provided at the upper edge of the strainer holder and are inserted into corresponding counterslots on the inside lower edge of the brewing head by means of a vertically upward movement when the strainer holder is coupled to the brewing head. The strainer holder is thereafter locked with the brewing head by means of a rotation of the strainer holder. A sealed connection between the brewing head, the strainer, the strainer holder is thereby produced on a screw-shaped, slanted plane.

The procedure of inserting the lugs into the slots cannot be seen; therefore, practice is required to be able to bring the strainer holder into the correct position without tipping and an extensive loss of time.

SUMMARY OF THE INVENTION

It is an object of the invention to provide an espresso machine having the features mentioned at the outset and in which there is provided a structurally simple mechanism for ensuring that the correct position in which the strainer holder is to be inserted into the brewing head from below can be found easily and quickly.

The above and other objects are accomplished in the context of an espresso machine having an underside provided with a brewing head into which a strainer holder having a handle can be inserted from below with a strainer inserted in the holder, wherein the brewing head has slots and the strainer holder includes corresponding lugs that fit through the slots so that the strainer holder can be released from or locked to the brewing head by a pivoting movement of the strainer holder around an axis of the brewing head which places the lugs in or out of alignment with the slots, respectively, wherein according to the invention there is additionally provided a positioning ring having a top end rotatably secured to the brewing head, a bottom end and a cutout that is open toward the bottom end for receiving the handle of the strainer holder; and means cooperating between the positioning ring and the brewing head for locating the positioning ring in an initial position so that when the cutout in the positioning ring receives the handle of the strainer holder, the strainer holder can be raised and inserted into the brewing head with the lugs on the strainer holder in alignment with the slots in the brewing head.

As a result of the invention, if it is desired to insert the strainer holder into the brewing head of the espresso machine, it need only be ensured that the positioning ring be located in the initial position in which the strainer holder can be inserted into the brewing head. The strainer holder is then inserted from below into the brewing head in the angular position in which the handle of the strainer holder fits into the cutout of the positioning ring which is already in the correct insertion position for the strainer holder. The strainer holder is then moved upwardly, during which the positioning ring is also moved upwardly, or remains in the same place, and the correct position for locking the bayonet catch is then found without further attempts.

There are numerous embodiments for the locating mechanism which locates the initial position of the positioning ring. One of these embodiments is characterized in that the mechanism is configured as a latch, for example as a spring-loaded ball or the like provided on one of the two parts and which locks in a corresponding recess on the other part in the initial position. Because of this, when the positioning ring is rotated back into the initial position there is an indication of when and in which angular position the initial position is reached.

Another and likewise preferred embodiment of the locating mechanism is characterized in that the mechanism has a restoring spring that seeks to rotate the strainer holder against a stop marking the initial position. In the process, the restoration of the positioning ring into the initial position is supported by the spring force, and the stop marks the mentioned initial position.

Another, particularly structurally simple embodiment of this locating mechanism is characterized by the provision of a visual display such as a marking on the brewing head which aligns with another marking on the positioning ring when the positioning ring is in the initial position. In this case one need only ensure that two marks are opposite one another to ensure that the initial position is reached.

The cutout already provided on the positioning ring, opposite which a corresponding marking is located on the brewing head or on the espresso machine itself in the initial position of the positioning ring, can be used for the marking on the positioning ring.

It is additionally pointed out that, due to space constraints, the positioning ring is rotatably secured to the outside of the brewing head. The positioning ring is captively held, for example by a pin on one of the parts, which pin extends into a corresponding groove on the other part, or also by means of an annular shoulder on the positioning ring that overlaps a corresponding shoulder on the brewing head.

The invention is described in detail below in conjunction with the accompanying drawings by reference to a preferred embodiment.

DETAILED DESCRIPTION OF THE PREFERRED EMBODIMENT

Figure 1:
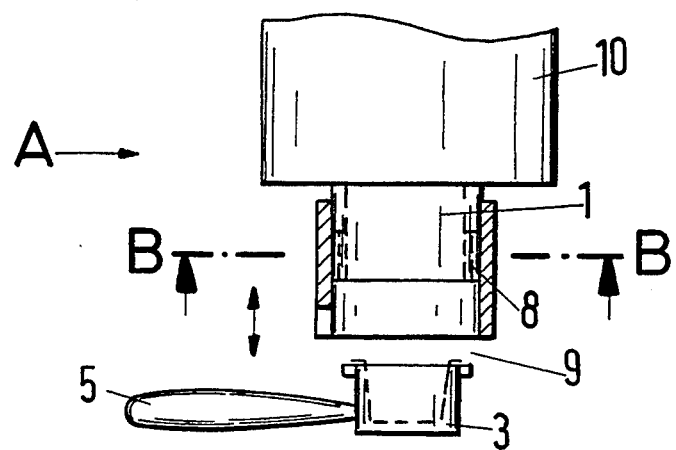
FIG. 1 is a schematic side view, in partial section, of components of an espresso machine according to the invention, the strainer holder being shown in an initial position for insertion into the brewing head from below the brewing head.
Figure 2:
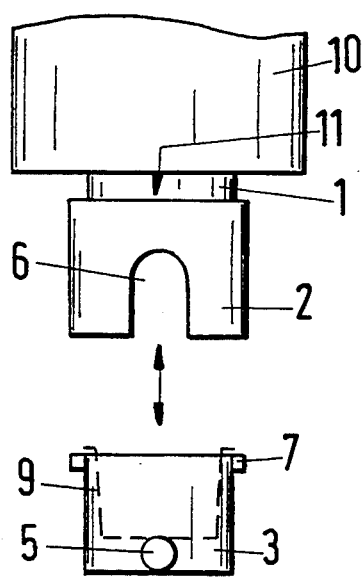
FIG. 2 is a view in the direction of arrow A of FIG. 1.

Referring to FIGS. 1 and 2, there is shown a lower part of an espresso machine 10, on whose underside a brewing head 1 is provided. On the inside, the brewing head has counterslots 8, which cooperate with lugs 7 on the top outside of a strainer holder 3 in the manner of a bayonet catch.

A coffee strainer 9 is inserted into strainer holder 3 in the usual manner. In addition, an outwardly-pointing handle 5 is secured to the strainer holder.

In accordance with the invention there is provided an insertion aid for the strainer holder which includes a positioning ring 2 captively and rotatably positioned on the outside of the brewing head 1. Positioning ring 2 has a cutout 6 that is open toward its bottom end.

FIGS. 1 and 2 show that, to insert strainer holder 3 into the brewing head from below, the strainer holder is disposed such that it extends from below with its handle 5 into cutout 6 of positioning ring 2. Suitable measures, as discussed below, are previously taken to ensure that the positioning ring is in the initial position prior to the strainer holder being inserted from below into the brewing head. The strainer holder (with or without the positioning ring) can now be moved upwardly, so that the lugs 7 extend into counterslots 8. Thereafter the strainer holder is rotated, thus locking the strainer holder on the brewing head.

Releasing the strainer holder from the brewing head is effected accordingly with a reverse order of the movements; in this instance, it is also ensured that the positioning ring reassumes its initial angular position shown in the drawings.

Figure 3:
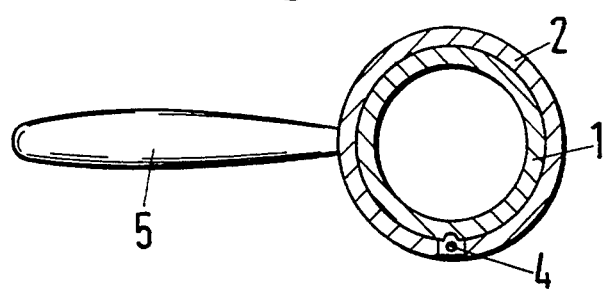
FIG. 3 is a sectional view along line 3—3 of FIG. 1.

To ensure that the positioning ring assumes this initial position, a latch can be provided as shown in FIG. 3. In the embodiment of FIG. 3, the latch comprises a spring-loaded ball 4 disposed on the positioning ring and extending into a corresponding recess on the brewing head when the positioning ring is in the initial position. Of course, the spring-loaded ball may be disposed on the brewing head and the recess on the positioning to obtain the same effect.

Alternatively, a restoring spring (not shown), can be provided which ensures that the positioning ring reassumes its initial position. Such a restoring spring seeks to rotate the strainer holder against a stop that marks the initial position of the positioning ring.

In an even simpler embodiment, in the initial position a marking 11 on the brewing head or on the machine is located opposite cutout 6, by means of which a visual display for the initial position is created.

A plurality of these locating mechanisms can also be provided, for example marking 11 combined with latch 4 or the restoring spring.

When the bayonet catch is closed, positioning ring 2 is thus co-rotated, and during opening it is rotated back into the initial position. The restoring spring or latch 4 causes the positioning ring to always remain in the initial position (zero position) when the strainer holder has been removed until the strainer holder can be reinserted into the brewing head.

It will be understood that the above description of the present invention is susceptible to various modifications, changes and adaptations, and the same are intended to be comprehended within the meaning and range of equivalents of the appended claims.

What is claimed is:

1. In an espresso machine having an underside provided with a brewing head into which a strainer holder having a handle can be inserted from below with a strainer inserted in the holder, wherein the brewing head has slots and the strainer holder includes corresponding lugs that fit through the slots so that the strainer holder can be locked to or released from the brewing head by a pivoting movement of the strainer holder around an axis of the brewing head which places the lugs in or out of alignment with the slots, respectively, the improvement comprising:

a positioning ring having a top end rotatably secured to said brewing head, a bottom end and a cutout that is open toward said bottom end for receiving the handle of said strainer holder; and means cooperating between said positioning ring and said brewing head for locating the positioning ring in an initial position so that when the cutout in the positioning ring receives the handle of the strainer holder, the strainer holder can be raised and inserted into the brewing head with the lugs on the strainer holder in alignment with the slots in the brewing head.

2. An espresso machine as defined in claim 1, wherein said locating means comprises a latch for latching said positioning ring to said brewing head when said positioning ring is in the initial position.

3. An espresso machine as defined in claim 2, wherein said latch comprises a spring-loaded ball on one of said positioning ring and said brewing head and a recess for accommodating said spring-loaded ball on the other of said positioning ring and said brewing head when said positioning ring is in the initial position.

4. An espresso machine as defined in claim 1, wherein said locating means includes a restoring spring that seeks to rotate said strainer holder against a stop that marks the initial position of said positioning ring.

5. An espresso machine as defined in claim 1, wherein said locating means comprises a marking on either said brewing head or a surface of the espresso machine.

6. An espresso machine as defined in claim 5, wherein the marking is located opposite the cutout when said positioning ring is in the initial position.

* * * * *